Feb. 28, 1967   W. MacCURDY   3,306,019
DEVICE FOR PICKING STEM-SUPPORTED ARTICLES
Filed March 27, 1964
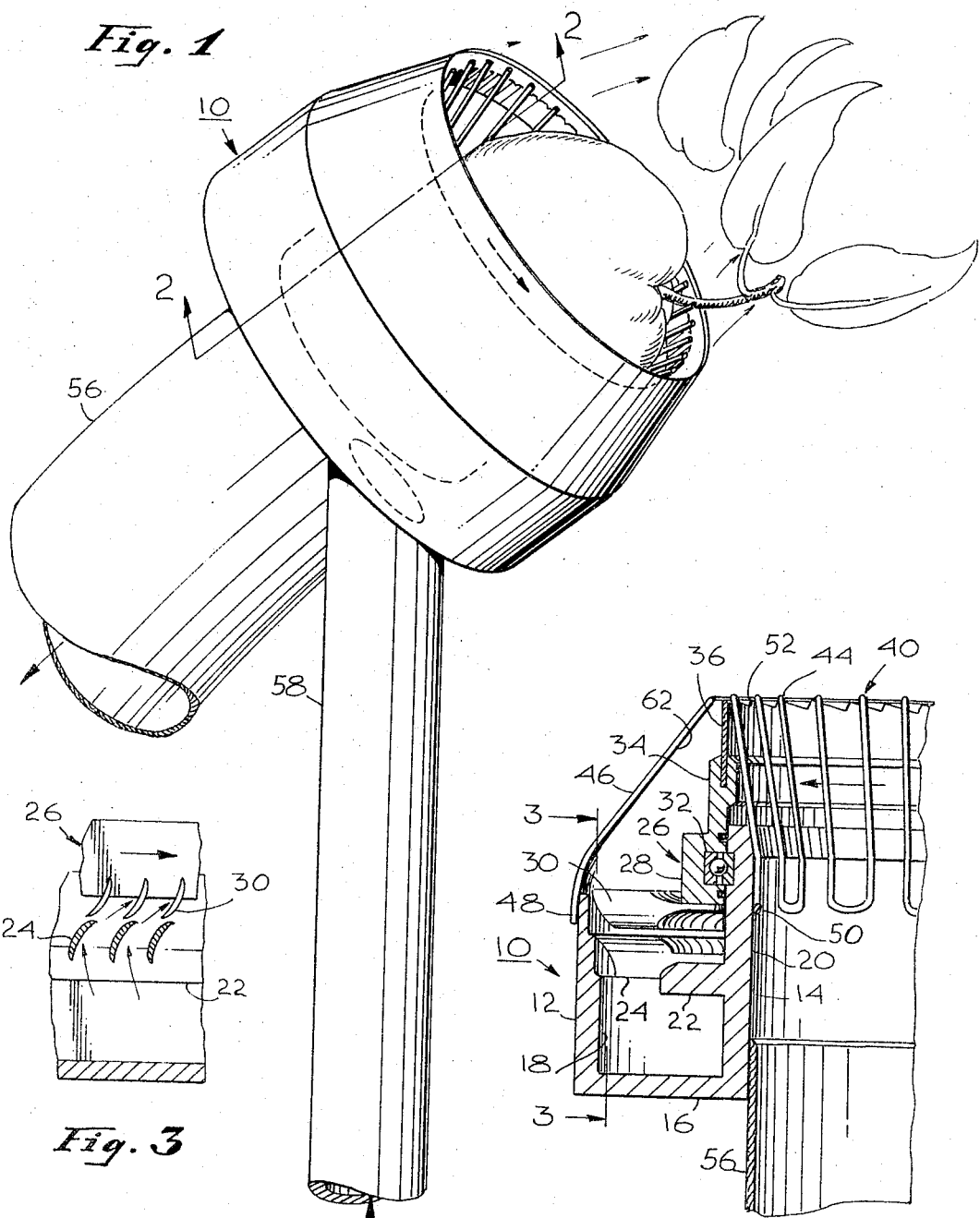
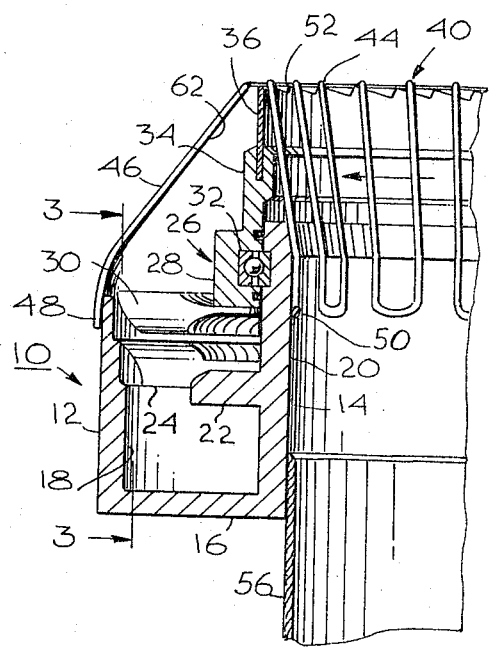
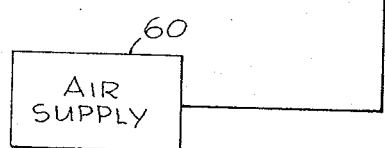
INVENTOR.
WILLIAM MacCURDY
BY Samuel Lindenberg
ATTORNEY

# United States Patent Office 3,306,019
Patented Feb. 28, 1967

3,306,019
DEVICE FOR PICKING STEM-SUPPORTED ARTICLES
William MacCurdy, Menlo Park, Calif., assignor to Stanford Research Institute, Menlo Park, Calif., a corporation of California
Filed Mar. 27, 1964, Ser. No. 355,279
10 Claims. (Cl. 56—332)

This invention relates to a device to improve the efficiency of picking stem-supported articles and has particular utility in the harvesting of edible products such as fruits or the like.

Efficient and economical crop harvesting has been given increased attention in recent years because of the increasing costs as well as increasing scarcity of farm labor resulting from the increased urbanization of the country. Efforts have been made to mechanize, whenever possible, the harvesting of crops. One agricultural area that has resisted effective mechanization is the harvesting of edible fruits, such as oranges, apples, cherries, and the like. This type of crop is grown on relatively large bushes or trees and there is a difficult physical problem presented to reach each article of fruit. Another problem in the harvesting of such produce, is that, on a given bush or tree individual articles of fruit will not ripen at the same time. Accordingly, an intellectual decision and selection must be made relative to the harvesting of a given fruit article. These difficulties in harvesting of this type of product and the consequent labor laws required has contributed importantly to the relatively high cost of fruit and fruit products to the consumer.

With the above in mind, it is a general object of the herein disclosed invention to provide a device that will substantially improve the efficiency of the harvest of stem-supported articles, such as apples, pears, oranges, cherries, and the like.

It is a further object of the invention to provide a harvesting or picking device which, while improving the efficiency of harvest, avoids fruit damage and thereby reduce produce loss.

It is yet a further object of the invention to provide a harvesting device of the type described which will allow the operator to easily and efficiently reach individual articles of fruit even though they may be physically located at a relatively high level on a tree or bush.

Specifically, the herein disclosed invention comprehends an annular housing which defines, centrally thereof, an open aperture of such physical dimension as will admit the entry of a given fruit article. A plurality of forwardly directed and spaced finger elements are carried by the housing in a manner to define an annular cavity therein. The fingers additionally are peripherally arranged around the annular section of the mentioned aperture, providing, as it were, an entrance funnel thereto. A stem cutting blade is carried by the housing for movement within the mentioned cavity. In the preferred embodiment of the invention, the stem cutting blade is fixedly carried by a turbine-like rotor which is bearing mounted to the housing for rotation about the mentioned article entrance aperture.

The housing has connected to it an extended handle which may be utilized by the harvester to manipulate the housing and bring fruit, located on a given bush or tree, into appropriate disposition within the fruit-receiving aperture. As the housing is manipulated via the mentioned handle, the given fruit article is positioned within the fruit-receiving aperture in such a manner that the supporting stem is received or is disposed intermediate any of the mentioned forwardly projecting fingers. In this manner, the fruit-supporting stem is interposed between any pair of fingers and becomes disposed within the mentioned cavity. As noted above, the stem cutting blade is rotated within the mentioned cavity thereby severing the given article of fruit from its tree.

Of course, power must be supplied to induce rotation of the turbine and carry the stem cutting blade. This may be accomplished in any one of several convenient ways. However, in the preferred embodiment of the invention, compressed air is utilized to induce the mentioned rotation. A suggested mode of accomplishing this action is to provide the housing with a plurality of annularly arranged stator blades fixedly carried by said housing. The stator blades are in communication with an annular air manifold formed by the housing. The mentioned manipulating handle may be formed of a hollow pipe, the latter having one end thereof in communication with the mentioned air manifold. The opposed end of the manipulating pipe may be operatively connected, in any convenient and flexible manner, to an appropriate source of air under pressure. The turbine rotor as noted above, may be provided with a plurality of annularly arranged fixed blades in operative association with the stator blades. Thus, as air under pressure is forced within the manifold, the stator blades force the air into turbine contact with the rotor blades inducing turbine rotation.

The suggested construction provides for air exhaust forwardly providing an annular curtain of moving air peripherally surrounding the fruit-receiving aperture. Thus the air exhaust tends to brush aside leaves and small branches, improving visibility and access to the fruit and thereby improving the efficiency of the harvesting operation.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a perspective view illustrating a preferred embodiment of the invention, FIGURE 2 is a sectional view taken along line 2—2 of FIGURE 1, and FIGURE 3 is a sectional view taken along line 3—3 of FIGURE 2.

Describing the invention in detail and directing attention to the figures, it will be seen that the numeral 10 indicates generally a cylindrically formed housing. In a preferred embodiment of the invention, the housing 10 comprises spaced generally parallel walls 12 and 14 and joining walls 16. The mentioned walls define an annular passage 18, said passage serving as an air manifold in the manner hereinafter described in detail. Wall 14 is also preferably cylindrically arranged to define an annular central opening within housing 10, said opening being indicated by the numeral 20.

Wall 14 has annularly projecting therefrom a fixed boss 22. Boss 22 has fixedly secured thereto and radially projecting therefrom a plurality of annularly arranged spaced stator blades 24. Thus, the stator blades 24 define a plurality of generally upwardly directed air passages communicating with the air manifold cavity 18.

The preferred embodiment of the invention additionally includes turbine structure indicated generally at 26. The turbine structure comprises annular bearing receiving ring 28, the latter serving as mounting structure for a plurality of annularly arranged rotor blades 30. The rotor blades 30 are fixedly secured to the underside of ring 28 and extend radially outwardly of the device and in spaced relation to each other. Additionally, the rotor blades 30 are in generally planar relation to the passages defined by the stator blades 24 so as to be in operative turbine relationship with the pressured air issuing from the air manifold 18.

Ring 28 additionally fixedly carries one race of the bearing element 32. It will be noted that the upper segment of wall 20 fixedly carries the opposite race of the mentioned bearing 32, whereby the entire rotor or turbine assembly 26 is journally carried from the device for annular rotation about the centrally defined cavity 20.

Base member 34 is fixedly secured, in any suitable manner, to the ring 28 and extends upwardly therefrom. Cutting blade 36 is fixedly mounted to the base 34 and projects upwardly therefrom as is clearly shown in FIGURE 2. It will thus be understood that the cutting blade 36, by virtue of this construction, is journally carried on the device for annular rotation around the central opening or fruit-receiving aperture 20.

An important feature of the herein disclosed invention relates to the guard assembly indicated generally at 40. Considering FIGURES 1 and 2, it will be seen that the guard assembly 40 comprises a cylindrical sheet metal member 46 attached at its lower end to wall 12 and U-shaped wire elements or fingers 44 are attached at one end to the upper portion of wall 20 and at the other end to the upper portion of element 46. A portion of each finger 44 is bent outwardly, as at 52, whereby all of the fingers cooperate to define a funnel-like entrance to the aperture 20. Further, each finger 44 is provided with an outer segment, which is bent inwardly to give the entire device a chamfered structure which tends to improve the visibility of the user and avoid sharp edges which could damage fruit.

It will be noted that the aperture 20 extends through the entire housing 10. A flexible tube 56 is secured to the device and communicates with aperture 20. While that is shown in detail, it will be understood that the hollow tube 56 would serve as a pipe or conveyor to efficiently and effectively conduct harvested produce to temporary storage.

Directing attention to FIGURE 1, it will be seen that the housing 10 has affixed thereto a manipulating arm, fragmentarily illustrated at 58. In the presently preferred embodiment of the invention, the arm 58 comprises a hollow pipe having the upper end thereof connected to the housing 10 in such a manner so that it is in communication with the air manifold 18. It will be understood that the arm 58 may be connected by any suitable flexible lead (not shown) to a source of pressured air indicated schematically at 60. In this manner, air under relatively high pressure, is channeled via the manipulating arm 58 to the air manifold 60, and from there it is directed by the stator blades 24 to operative turbine engagement with rotor blades 30. It will thus be apparent to those skilled in the art, that the pressured air serves as a power source to induce continuous rotation of the ring 28 and the carried cutting blade 36. Further, it will be apparent that the rotation of the cutting blade 36 is annular around the aperture 20 within the annular cavity 62 defined by the guard assembly 40.

Briefly describing the operation and use of the disclosed harvesting device, it will be understood, that the operator manually directs and orients the device by manipulating handle 58. As shown in FIGURE 1, the operator may select an appropriate article, such as the fruit product shown in said figure, and visually determine that the given article is ready for harvesting. By manual manipulation, the product is disposed within the funnel entrance, and into the passage 20. It will be noted that spaced relation of the fingers 44 of the guard assembly 40 is such that said guard assembly will support the fruit and prevent any segment thereof from entering the cavity 62. Additionally, the spaced relation of said fingers is such that large branches or the like from the tree will also be prevented from entering the cavity 62. The stem, however, that supports the fruit product from the tree is of relatively small diameter and is disposed between any of the respective fingers 44. Recalling that air under pressure is continuously being diverted to the picking device, it will be understood that the knife blade 36 is in continuous rotation within the cavity 62. Consequently, as the stem enters the cavity 62 intermediate any of the fingers 44, it is contacted by the cutting blade 36 and the product is severed from supporting relation on the bush or tree. Gravity, of course, will cause the product to move down passage 20 into the flexible tube 56 whereby it is conveyed to a temporary storage (not shown).

While power from any convenient source may be utilized to induce rotation of the rotor assembly 26, a particular advantage results when the compressed system herein disclosed is employed and combined with the structure illustrated. Specifically, air exhaust, after inducing rotor rotation is directed forwardly and annularly around the entrance passage 20. In this manner, an annular curtain of moving air is provided immediately in front of the device. This has the effect of brushing aside leaves and small branches on the tree improving visibility of the operator and improving access to the product. Additionally, this air curtain inhibits the accidental cutting of leaves and the like, avoiding excessive mess and accidental clogging of the moving parts of the equipment.

There has accordingly been described and shown herein a novel and unique apparatus which will substantially improve the harvesting of many stem-supported fruit products. The presently preferred embodiment of the invention is patently simple, inexpensive and relatively light in weight. The device enables the operator to select only those articles or products which are clearly ripe or in a condition for harvest and enables him to have access thereto even though the product may be in difficult physical location such as at the top of a relatively high tree or bush. It will also be noted and understood that the arrangement is such that human contact with the food product is eliminated during the harvesting operation. Efficient harvesting of the product results and it is automatically carried to temporary storage. The harvesting is also accomplished in a manner that minimizes accidental damage to the product as well as the tree or bush from which it is being removed.

The embodiments of the invention in which an exclusive property or privilege is claimed are defined as follows:

1. In a picking device for stemmed growing edibles, an annular housing defining an opening to receive and pass therethrough an edible, passage means communicating with the housing to accommodate transport of the edible, an annular cutting element journally carried by and within the housing opening and adjacent one end thereof, a plurality of spaced wire fingers peripherally surrounding said opening and monuted on said annular housing over said cutting element, power means supported on said housing for rotating said cutting element, said cutting element being operative to cut the stem of an edible upon the insertion of the edible into the housing opening with its stem adjacent said cutting element.

2. A picking device for stemmed growing edibles according to claim 1, wherein said housing includes an annular air manifold, turbine blade means carried by the element and in operative communication with the manifold, said power means comprising fluid under pressure circulating through the manifold for impingement on said blade means to thereby induce cutting element motion.

3. A picking device for stemmed growing edibles according to claim 2 including means for directing said fluid under pressure is ejected from the housing opening in the direction of the insertion of said edible.

4. In a picking device for articles normally supportably carried by a stem element, a housing defining a passage to receive and pass therethrough the article, an annularly shaped stem element cutting means, means supporting said cutting means for rotation within and adjacent an end of said housing, and wire guard means supported by said housing over said cutting means to guide the stem element into cutting relationship with the cutting means upon disposition of the article into the passage.

5. In a picking device for stem supported articles, an annular housing defining a central opening adapted to receive an article, a stem severing element extending generally longitudinally of the axis of the opening, said severing element being journally carried by the housing for peripheral rotation around the opening, stem guide and article protecting means supported by said housing over said stem severing element, said stem guide and article protecting means extending generally longitudinally of the axis of the opening and telescopically receiving the severing element, and power means annularly supported on said housing to move the severing element.

6. A picking device for stem supported articles according to claim 5, wherein said guide and protecting means comprises a plurality of spaced fingers, said fingers being in such spaced relation so as to offer surface support of the article and admission of the stem between the fingers upon disposition of the article in said opening.

7. A picking device for stem supported articles according to claim 6, wherein said power means comprises an air manifold defined by the housing, spaced stator blades fixedly carried by the housing and communicating with the manifold, rotor blades fixedly carried by the severing element in operative relation with the stator blades and for rotational movement with the severing element, and a source of air under pressure communicating with the manifold.

8. A picking device for stem supported articles according to claim 7, and including means to vent the pressured air forwardly of the device.

9. A picking device for stem supported articles according to claim 8, and including pipe means connected to the housing to accommodate manual manipulation of the device.

10. A picking device for stem supported articles according to claim 9, and including article conveyor tube in communication with the opening, said pipe means providing a channel for conveying the pressured air to the manifold.

References Cited by the Examiner
UNITED STATES PATENTS

| | | | |
|---|---|---|---|
| 194,323 | 8/1877 | Berbeyer | 56—335 |
| 561,575 | 6/1896 | Edgarton | 56—336 |
| 1,307,417 | 6/1919 | Powers | 56—335 |
| 1,632,977 | 6/1927 | Lavagnino | 56—336 |
| 2,179,031 | 11/1939 | Bustetter et al. | 56—336 |
| 2,246,747 | 6/1941 | Metzger | 56—335 |
| 2,312,933 | 3/1943 | Seiders | 30—29.5 |
| 2,711,625 | 6/1955 | Bullock | 56—332 |
| 2,775,088 | 12/1956 | Bullock | 56—332 |
| 2,968,907 | 1/1961 | Bernheim et al. | 56—332 |
| 3,165,880 | 1/1965 | Buie | 56—336 |

ABRAHAM G. STONE, *Primary Examiner.*
RUSSELL R. KINSEY, *Examiner.*